(12) United States Patent
Lasobras Bernad et al.

(10) Patent No.: US 12,504,173 B2
(45) Date of Patent: Dec. 23, 2025

(54) DOMESTIC APPLIANCE SYSTEM

(71) Applicant: BSH Hausgeräte GmbH, Munich (DE)

(72) Inventors: Javier Lasobras Bernad, Ejea de los Caballeros (ES); Teresa Del Carmen Marzo Alvarez, Saragossa (ES); Esther Ondiviela Serrano, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 902 days.

(21) Appl. No.: 17/774,876

(22) PCT Filed: Nov. 10, 2020

(86) PCT No.: PCT/EP2020/081635
§ 371 (c)(1),
(2) Date: May 6, 2022

(87) PCT Pub. No.: WO2021/104852
PCT Pub. Date: Jun. 3, 2021

(65) Prior Publication Data
US 2022/0404023 A1    Dec. 22, 2022

(30) Foreign Application Priority Data
Nov. 27, 2019   (EP) .................................. 19383055

(51) Int. Cl.
*F24C 7/08*     (2006.01)
*G05B 19/042*   (2006.01)

(52) U.S. Cl.
CPC ............ *F24C 7/083* (2013.01); *G05B 19/042* (2013.01); *G05B 2219/2642* (2013.01)

(58) Field of Classification Search
CPC .......... F24C 7/083; F24C 7/08; G05B 19/042; G05B 2219/2462; G05B 2219/2642
See application file for complete search history.

(56) References Cited

U.S. PATENT DOCUMENTS

| | | | |
|---|---|---|---|
| 2015/0042453 A1 | 2/2015 | Beifuss | |
| 2016/0204955 A1 | 7/2016 | Chin | |
| 2016/0291600 A1* | 10/2016 | Polo | H04W 4/80 |
| 2017/0227941 A1* | 8/2017 | Chosokabe | H05B 45/00 |
| 2017/0310810 A1* | 10/2017 | Kuemmerle | F24C 7/08 |

FOREIGN PATENT DOCUMENTS

| | | |
|---|---|---|
| DE | 102016123404 A1 | 6/2018 |
| DE | 102017220958 A1 | 6/2018 |

OTHER PUBLICATIONS

International Search Report PCT/EP2020/081635 dated Apr. 8, 2021.

* cited by examiner

*Primary Examiner* — Robert G Bachner
(74) *Attorney, Agent, or Firm* — Michael E. Tschupp; Andre Pallapies; Brandon G. Braun

(57) ABSTRACT

A household appliance system includes a household appliance, an external unit for operating the household appliance, and a control unit designed to perform a characterization process and to enable operation of the household appliance by the external unit, when the characterization process has been completed.

19 Claims, 5 Drawing Sheets

DOMESTIC APPLIANCE SYSTEM

CROSS-REFERENCES TO RELATED APPLICATIONS

This application is the U.S. National Stage of International Application No. PCT/EP2020/081635, filed Nov. 10, 2020, which designated the United States and has been published as International Publication No. WO 2021/104852 A1 and which claims the priority of European Patent Application, Serial No. 19383055.1, filed Nov. 27, 2019, pursuant to 35 U.S.C. 119(a)-(d).

The contents of International Application No. PCT/EP2020/081635 and European Patent Application, Serial No. 19383055.1 are incorporated herein by reference in their entireties as if fully set forth herein.

BACKGROUND OF THE INVENTION

The present invention relates to a household appliance system and a method for operating a household appliance system.

The prior art already discloses a household appliance system that has a control unit, a household appliance and an external unit. The external unit is provided so as to operate the household appliance by means of an operating signal. In one operating mode, the control unit checks, in the event that an operating signal has been received from the external unit, whether the external unit is arranged in an operating range within which it is permissible on the basis of legal requirements for the household appliance to be operated by the external unit. In this case, the operating range is predefined and independent of a layout of a room in which the household appliance is arranged. During the check as to whether the external unit is arranged in an operating range, the control unit takes into consideration an operating signal that is transmitted from the external unit to the household appliance. In dependence upon a signal strength of the operating signal, the control unit decides whether the external unit is arranged in an operating range and in fact does so independently of a design and type of the external unit.

BRIEF SUMMARY OF THE INVENTION

In particular, without being limited thereto, the object of the invention is to provide a generic system with improved characteristics with respect to operating convenience.

In one aspect of the invention, which can be considered in its own right or jointly with other aspects of the invention, a household appliance system is proposed that has at least one control unit which is provided for performing at least one characterization process and upon completion of the characterization process so as to enable an operation at least of one household appliance by at least one external unit.

It is possible using a design of this type to achieve in particular a high degree of operating convenience. It is possible in particular to provide a precise and/or exact operation of the household appliance since in particular inaccuracies are excluded by the calibration and/or an operation of the household appliance by the external unit can only be enabled if predefined requirements are fulfilled.

In a further aspect of the invention, a household appliance system having at least one control unit is proposed, wherein said control unit is provided so as in one operating mode to automatically check at least in intervals whether an external unit for operating at least one household appliance is arranged in an operating range and in the event that the external unit is arranged within the operating range to enable the operation of the household appliance by the external unit.

It is possible using a design of this type to achieve in particular a high degree of operating convenience. In particular, it is possible to avoid it being necessary for an operator to provide a manual confirmation directly following a transmission of an operating signal from the external unit to the household appliance and as a result it is possible in particular to achieve a reduced operating effort for an operator. It is rendered possible to achieve in particular a convenient and/or rapid and/or uncomplicated operation of the household appliance by the external unit.

The term a "household appliance system" is to be understood in particular to mean a system which has at least one household appliance object and/or at least the household appliance and/or at least one household appliance accessory object and which could have in particular in addition at least one kitchen object and/or at least one further component which could be designed differently in particular from a household appliance object and/or from a household appliance and/or from a household appliance accessory object. The term a "household appliance object" is to be understood to mean in particular at least one part, in particular a sub assembly, a household appliance, in particular a cooking appliance, advantageously an induction cooking appliance, particularly advantageously a hob and preferably an induction hob. The term "household appliance accessory object" is to be understood to mean in particular an object which is provided in particular for use and/or for an application with a household appliance and/or which is designed in particular as at least one accessory part and/or as at least one set of accessory parts for a household appliance. The term a "kitchen object" is to be understood in particular to mean an object which is provided for use and/or for an application and/or for arrangement in a kitchen and in fact in particular for processing and/or handling and/or preserving at least one foodstuff.

The term a "household appliance" is to be understood to mean in particular an electrical appliance which has in particular at least one household appliance control unit so as to control and/or regulate at least one household appliance function and/or at least one household appliance main function. The household appliance is particularly advantageously a white goods appliance which is provided in particular so as to perform household work.

For example, the household appliance could have at least one refrigeration appliance and could be advantageously designed as a refrigeration appliance. The household appliance that is designed in particular as a refrigeration appliance could have for example at least one freezer cabinet and/or at least one upright refrigerator and/or at least one upright freezer and/or at least one combination appliance and/or is designed as such. The household appliance that is designed in particular as a refrigeration appliance could be provided for example so as to store and/or to preserve and/or to cool foodstuffs and/or chilled goods, such as for example drinks and/or meat and/or fish and/or milk and/or milk products.

For example as an alternative or in addition thereto, the household appliance could have at least one cleaning appliance and in particular be designed as a cleaning appliance. The household appliance that is designed in particular as a cleaning appliance could have for example at least one dryer and/or at least one washing machine and/or at least one dishwasher and/or could be designed as such. For example, the household appliance that is designed as a cleaning appliance could be provided so as to clean for example crockery and/or laundry and/or a room and/or a piece of furniture.

The household appliance could have for example as an alternative or in addition thereto in particular at least one cooking appliance and advantageously at least one induction cooking appliance and/or could be designed as a cooking appliance and advantageously as an induction cooking appliance. For example, the household appliance that is designed in particular as a cooking appliance could have at least one oven and/or at least one microwave and/or at least one grilling appliance and/or at least one steam cooking appliance and/or could be designed as such. The oven could be for example a cooker and/or a baking oven.

Advantageously, the household appliance that is designed in particular as a cooking appliance could have in particular as an alternative or in addition thereto in particular at least one hob and advantageously at least one induction hob and/or could be designed as a hob and advantageously as an induction hob.

In particular, the household appliance has the household appliance control unit which is designed in particular as a control unit that is integrated at least in part and advantageously at least to a large extent in the household appliance. The term a "control unit" is to be understood to mean in particular an electrical and/or electronic unit which in one operating mode controls and/or regulates at least one appliance function and/or at least one appliance main function. The control unit has advantageously at least one computing unit and advantageously in addition to the computing unit at least one storage unit in which advantageously at least one control and/or regulating program is installed, said program being provided for execution by the computing unit.

The control unit controls and/or regulates in one operating mode, in particular automatically, in particular the operation of the household appliance by the external unit. In particular, the control unit so as to the control and/or regulate in one operating mode enables the operation of the household appliance by the external unit and/or blocks the operation of the household appliance by the external unit.

The expression that an object is integrated "at least in part" in a further object is to be understood in particular to mean that the object has at least one object element which is integrated in the further object, and in particular could have in addition to the object element at least one further object element which could be arranged outside the further object and/or separately from the further object. The term "at least to a large extent" is to be understood to mean in particular a proportion, in particular a mass proportion/or a volume proportion, of at least 70%, in particular of at least 80%, advantageously of at least 90% and preferably of at least 95%.

The term "automatically" is to be understood to mean in particular independently and/or while avoiding operational intervention and/or while avoiding an operator input in the form of a confirmation. The operational intervention is for example operator activities in connection with a confirmation and/or in particular any type of operator activity which differs from transmitting an operation signal.

The expression that the control unit is provided so as in one operating mode to check automatically "at least in intervals" whether an external unit for operating at least one household appliance is arranged in an operating range is to be understood to mean that the control unit in one operating mode over a time period of at least 2 min, of at least 3 min, advantageously of at least 5 min, particularly advantageously of at least 10 min, preferably of at least 15 min and particularly preferably of at least 20 min automatically checks whether the external unit for operating the household appliance is arranged in the operating range. In particular, in one operating mode, the control unit checks a number of at least two, in particular of at least three, advantageously of at least five, particularly advantageously of at least ten, preferably of at least fifteen and particularly preferably of at least twenty operating signals that in particular directly follow one another in a chronological manner.

The term an "operating signal" is to be understood in particular to mean an electrical and/or electronic signal which is provided so as to operate, such as for example to activate and/or to deactivate and/or to change, at least one household appliance function and/or at least one household appliance main function. The operating signal differs in particular from a confirmation signal for confirming that a previously transmitted operating signal has been implemented.

The term an "operating range" is intended to be understood in particular to mean a spatial area within which an operation of the household appliance by the external unit is permissible and corresponds in particular to legal requirements. For example, the operating range could be predefined for example independently of a prevailing design and/or independently of a prevailing layout and in fact for example in size and/or shape. The operating range is advantageously dependent in particular in size and/or shape upon a prevailing design and/or upon a prevailing layout.

Advantageously, the operating range, in particular in size and/or shape, is limited to a room, in particular to a size and/or shape and/or layout of a room in which the household appliance arranged. The operating range could be in particular dependent upon the furniture of a room in which the household appliances arranged. For example, extreme values and/or characteristics of the operating range could be predefined which, in particular in the case of a very large room, could limit and/or define the operating range.

Starting from the household appliance, for example, the operating range could extend within at least one maximum distance from the household appliance. The maximum distance from the household appliance could be predefined for example by the extreme values and/or characteristics of the operating range. In particular as an alternative or in addition thereto, the maximum distance from the household appliance could be defined and/or specified by a room, in particular by a prevailing configuration and/or by a prevailing layout of a room.

In one operating mode, the control unit, in particular in dependence upon a result of the check that is performed automatically at least in intervals, in particular enables in particular an operation of the household appliance by the external unit in the event that the external unit is arranged within the operating range. In particular, the control unit, in particular in dependence upon a result of the check that is performed automatically at least in intervals, blocks an operation of the household appliance by the external unit in the event that the external unit is arranged outside the operating range.

In particular in the event that the external unit is arranged outside the operating range, the control unit could, in particular in dependence upon a result of the check that is performed automatically at least in intervals, in one operating mode for example block an operation of the household appliance by the external unit in the event that the external unit is arranged outside the operating range and enable the monitoring of the household appliance by the external unit in the event that the external unit is arranged within at least one monitoring range.

The term a "monitoring range" is to be understood to mean a spatial area within which an operation of the household appliance by the external unit is inadmissible and within which only a monitoring of the household appliance by the external unit is permissible and in particular fulfills legal requirements. The term a "monitoring" of the household appliance is to be understood to mean in particular a supervision, in particular passively, advantageously optically, of the household appliance while avoiding an operator intervention. When the household appliance is being monitored by the external unit, it is not possible in particular for operating signals and/or operating commands to be transmitted and/or said transmission is prevented. In particular, the monitoring of the household appliance is limited to optical supervision and/or to an optical inspection. The monitoring range is arranged in particular directly adjacent to the operating range and advantageously adjoins the operating range. The monitoring range advantageously surrounds the operating range and is in particular arranged around the operating range.

The expression that the control unit is provided so as to "enable" the operation of the household appliance by the external unit is to be understood in particular to mean that the control unit in one operating mode enables and/or renders possible and/or allows the operation of the household appliance by the external unit. The expression that the control unit is provided so as to "block" the operation of the household appliance by the external unit is to be understood to mean in particular that the control unit in one operating mode prevents and/or does not allow and/or inhibits the operation of the household appliance by the external unit.

The expression that the control unit is provided for "performing" at least one characterization process is to be understood to mean in particular that the control unit in one operating mode, in particular by means of at least one output via at least one output unit and/or via at least one operator interface, requests at least one action and/or outputs at least one piece of information, and/or that in one operating mode the control unit automatically performs and/or initiates characterization steps that are necessary for performing the characterization process.

The expression that in one operating mode the control unit automatically "initiates" characterization steps that are necessary for performing the characterization process is to be understood to mean in particular that the control unit in one operating mode automatically controls and/or regulates at least one further unit which in dependence upon the control and/or regulation by the control unit performs and/or carries out characterization steps that are necessary for performing the characterization process.

The term a "characterization process" is to be understood to mean in particular a process which is provided so as to characterize at least one characteristic variable and/or at least one object which is essential and/or at least plays a role during the operation of the household appliance by the external unit. For example, the object that is to be characterized could be the external unit and/or the household appliance and/or the operating range and/or the monitoring range. The characteristic variable that is to be characterized could be for example a parameter and/or a characteristic of the object that is to be characterized. For example, the characteristic variable that is to be characterized could be a distance, in particular between the household appliance and the external unit, and/or a distance, in particular between the household appliance and the external unit, and/or a layout, in particular of a room in which the household appliance is arranged, and/or a signal strength, in particular of the operating signal, and/or a relative orientation, in particular between the household appliance in the external unit.

The characterization process could be provided for example so as to define at least one characteristic for the purpose of a minimal deviation of the defined characteristic from at least one reference value of the characteristic. The characteristic could be for example a spatial extent, for example of a spatial area and advantageously of the operating range. In particular as an alternative or in addition thereto, the characteristic could be for example in particular an electrical and/or electronic signal strength in particular at least of an electrical and/or electronic signal and advantageously of the operating signal.

Advantageously, the characterization process has at least one signal calibration process which is provided in particular so as to calibrate at least one signal of the external unit. The characterization process has advantageously at least one range definition process which is provided in particular for defining at least the operating range.

In particular, the control unit is provided so as to perform the characterization process chronologically prior to an operation of the household appliance and to use it as a basis for subsequent operation. In one operating mode, the control unit performs the characterization process chronologically prior to an operation of the household appliance and uses the characterization process in particular as a basis for a subsequent operation which includes in particular the operation of the household appliance by the external unit.

In one operating mode, the control unit performs the characterization process in particular, when considered chronologically, prior to an operation of the household appliance by the external unit. In particular, in one operating mode the control unit enables the operation of the household appliance by the external unit only after the characterization process has been completed. In one operating mode, the control unit advantageously only performs the automatic check at least in intervals after the characterization process has been completed.

For example, in one operating mode, the control unit could perform the characterization process in particular during the course of an, in particular first, activation of the household appliance and/or during the course of an, in particular first, connection of the external unit to the household appliance. In one operating mode, the control unit could repeat in particular at least the signal calibration process in a chronologically reoccurring manner, in particular for a specific external unit.

The household appliance system has in particular at least one operator interface by way of which in one operating mode the control unit performs the characterization process in particular. The operator interface is provided in particular for an interaction between an appliance, in which the operator interface is integrated at least in part, and an operator. In particular, the operator interface is provided for an input and/or output at least of one operating parameter and/or at least one piece of information, and in fact in particular in a haptic and/or acoustic and/or optical manner.

The operator interface could be integrated for example at least in part, in particular at least to a large extent and advantageously fully, in the external unit. For example as an alternative or in addition thereto, the operator interface could be integrated for example at least in part, in particular at least to a large extent and advantageously fully, in the household appliance.

The term "provided" is to be understood to mean in particular specially programmed, designed and/or equipped. This is also to be understood in particular to mean that an object is provided for a specific function, that the object fulfills and/or carries out this specific function in at least one application mode and/or operating mode.

Moreover, it is proposed that the control unit is provided so as to take into consideration during the automatic check at least one measurement of the distance between the external unit and at least one point in the household appliance. In particular, in one operating mode the control unit takes into consideration during the automatic check at least one measurement of the distance between the external unit and at least one point in the household appliance. In one operating mode, the control unit determines by means of the distance measurement in particular a spatial distance between the external unit and the point on the household appliance. In one operating mode, the control unit could in dependence upon the distance measurement, and in particular in dependence upon a result of the characterization process, in particular determine whether the external unit is arranged within the operating range, and in particular in dependence upon a result of the determination enable and/or block the operation of the household appliance by the external unit. For example, in one operating mode, the control unit could take into consideration during the automatic check, in particular exclusively, at least one distance measurement of the external unit to an, in particular individual, point on the household appliance. In one operating mode, the control unit could take into consideration for example at least one distance measurement of the external unit to at least two, in particular at least three, advantageously at least five, particularly advantageously at least ten, preferably at least fifteen and particularly preferably a multiplicity of points on the household appliance. As a consequence, it is possible in particular to provide a precise statement regarding an arrangement of the external unit in the operating range, whereby in particular it is possible to enable and/or block in a rapid and/or convenient manner the operation of the household appliance by the external unit.

In one operating mode, the control unit could carry out the distance measurement for example by means of a time measurement, whereby the control unit detects in particular a time period which a light signal requires for travelling the distance between the household appliance and the external unit. It is preferred that the control unit is provided so as to carry out the distance measurement by means of at least one signal strength measurement. In particular, in one operating mode, the control unit carries out the distance measurement by means of at least one signal strength measurement. The control unit determines during the signal strength measurement in particular a signal strength at least of one signal at the external unit and a signal strength of the signal, in particular of the same signal, at the house appliance. In one operating mode, the control unit determines, in particular in dependence upon the signal strengths of the signal at the external unit and at the household appliance, a decrease in the signal strength and by means of the decrease in the signal strength determines in particular the distance between the external unit and the household appliance, in particular between the external unit and the point of the household appliance. As a consequence, it is possible to determine in a particularly precise manner a distance between the external unit and the household appliance, whereby in particular it is possible to have a small error tolerance during the automatic check.

For example, in one operating mode, the control unit could take into consideration during the automatic check at least one signal strength measurement at least of one operating signal that is transmitted from the household appliance to the external unit. It is preferred that the control unit is provided so as during the automatic check to take into consideration at least one signal strength measurement at least of one operating signal that is transmitted from the external unit to the control unit. In one operating mode, the control unit takes into consideration during the automatic check in particular at least one signal strength measurement at least of one operating signal that is transmitted from the external unit to the control unit. As a consequence, it is possible to achieve an optimized operation of the household appliance by the external unit, since the signal strength measurement can be carried out in particular under identical conditions as the operation of the household appliance by the external unit.

Moreover, it is proposed that the control unit is provided so as to compare the operating signal with at least one operating signal reference range and in the event that the operating signal is arranged within the operating signal reference range to enable the operation of the household appliance by the external unit. In particular, in one operating mode, the control unit compares the operating signal with at least one operating signal reference range and in the event that the operating signal is arranged within the operating signal reference range said control unit enables the operation of the household appliance by the external unit. The household appliance system could have for example at least one database in which the operating signal reference range could be in particular deposited and/or stored. For example, the control unit could draw the operating signal reference range from the database and/or from at least one network, such as for example a local and/or regional and/or international network. The control unit could have for example at least one storage unit in which the operating signal reference range could be in particular deposited and/or stored. The term an "operating signal reference range" is to be understood to mean in particular a value range which has and/or specifies a reference range and/or a set range for the operating signal. In one operating mode, the control unit enables the operation of the household appliance by the external unit exclusively in the event that the operating signal is arranged within the operating signal reference range. As a consequence, it is possible to ensure in particular a particularly high safety standard in which in particular it is possible to fulfill and/or comply with legal requirements and in which in particular it is possible to achieve in addition a high as possible and or maximum degree of operating convenience.

In addition, it is proposed that the control unit is provided so as in a chronologically reoccurring manner to automatically check whether the external unit for operating the household appliance is arranged in the operating range. In one operating mode, the control unit automatically checks in particular in a chronologically reoccurring manner whether the external unit for operating of the household appliance is arranged within the operating range. The term "chronologically reoccurring" is to be understood to mean in particular repeating at regular time intervals. Advantageously, the control unit automatically checks at regular time intervals of a maximum 300 s, in particular of a maximum 100 s, advantageously of a maximum 50 s, particularly advantageously of a maximum 30 s, preferably of a maximum 10 s and particularly preferably of a maximum 5 s whether the external unit for operating the household appliance is arranged in the operating range. The chronologically reoccurring automatic check is in particular an automatic and/or intrinsically set trigger for the automatic check. As a consequence, it is possible in particular to avoid an inadvertent operation of the household appliance by the external unit which is located outside the operating range, as a consequence of which is possible in particular to provide a safe and/or convenient embodiment.

Furthermore, it is proposed that the control unit is provided so as in dependence upon at least one movement characteristic variable of the external unit to automatically check whether the external unit for operating the household appliance is arranged in the operating range. In particular, in one operating mode, the control unit automatically checks in dependence upon at least one movement characteristic variable of the external unit whether the external unit for operating the household appliance is arranged in the operating range. In particular, the automatic check in dependence upon the movement characteristic variable of the external unit is an external trigger and/or a trigger that acts from the outside for the automatic check. The movement characteristic variable of the external unit could be for example a characteristic variable which defines and/or identifies and/or characterizes a movement of the external unit and/or a position change of the external unit and/or an acceleration of the external unit. The control unit could, for example as an alternative or in addition thereto, in particular in the event that the movement characteristic variable is smaller than a movement characteristic variable threshold value, forego an automatic check as to whether the external unit for operating the household appliance is arranged in the operating range, and in particular owing to the lack of movement handle the operation of the household appliance by the external unit as previously set. As a consequence, in particular in the case of a movement of the external unit, a new check can be performed as to whether the external unit for operating the household appliance is arranged in the operating range, whereby in particular an operation of the household appliance by the external unit from outside the operating range can be excluded.

The household appliance system has in particular at least one sensor unit which is provided for detecting at least the movement characteristic variable of the external unit. In one operating mode, the control unit detects in particular by means of the sensor unit the movement characteristic variable of the external unit. The term a "sensor unit" is to be understood to mean in particular a unit which has at least one detector for detecting at least the movement characteristic variable and which is provided in particular so as to output a value that characterizes the movement characteristic variable, wherein the movement characteristic variable is advantageously a physical and/or chemical variable. For example, in one operating mode the sensor unit could actively detect the movement characteristic variable, such as in particular by generating and transmitting a measurement signal, in particular an electrical and/or optical measurement signal. Alternatively or in addition thereto, in one operating mode, the sensor unit could in particular in a passive manner detect the movement characteristic variable, such as in particular by detecting at least one characteristic change at least of one sensor component and/or of the detector. The sensor unit could for example have at least one acceleration sensor and/or at least one gyroscope and/or at least one inertia sensor and/or at least one step counter and/or at least one pedometer.

In particular, the control unit is provided so as in dependence upon the movement characteristic variable to determine at least in part an arrangement of the external unit relative to the household appliance. In one operating mode, the control unit determines in dependence upon the movement characteristic variable at least in part an arrangement of the external unit relative to the household appliance. The expression that in one operating mode the control unit determines in dependence upon the movement characteristic variable "at least in part" an arrangement of the external unit relative to the household appliance is to be understood to mean that in one operating mode an arrangement of the external unit relative to the household appliance is exclusively determined in dependence upon the movement characteristic variable or both in dependence upon the movement characteristic variable and also in dependence upon at least one further characteristic variable. The further characteristic variable could be for example an original arrangement of the external unit relative to the household appliance and/or an original position of the external unit.

Furthermore, it is proposed that the control unit is provided so as in a chronologically reoccurring manner to output automatically at least one operating request for confirmation that the external unit is arranged within the operating range, and in fact in particular by means of the operator interface. In particular, in one operating mode, the control unit outputs in a chronologically reoccurring manner automatically at least one operational request for confirmation that the external unit is arranged within the operating range, and in fact in particular by means of the operator interface. In one operating mode, the control unit outputs the operational request for confirmation that the external unit is arranged within the operating range in particular at regular time intervals of at least 5 min, in particular of at least 1 min, advantageously of at least 15 min, particularly advantageously of at least 20 min, preferably of at least 25 min and particularly preferably of at least 30 min, and in fact in particular by means of the operator interface. As a consequence, it is possible to ensure in particular a high degree of safety and/or to comply with and/or fulfill the legal requirements in an optimal manner.

For example, in one operating mode, the control unit could keep a time period between two operational requests, which in particular follow one another directly in a chronological manner, in particular at least essentially constant and advantageously constant, and in fact in particular independently of a time interval with respect to the characterization process. It is preferred that the control unit is provided so as to change a time period between at least two operational requests, which in particular follow one another directly in a chronological manner, in dependence upon a time interval with respect to the characterization process, such as for example to reduce and advantageously to increase said time interval. In one operating mode, the control unit changes in particular a time period between at least two operational requests, which in particular follow one another directly in a chronological manner, in dependence upon a time interval with respect to the characterization process. In one operating mode, the control unit could for example reduce a time period between at least two operational requests, which in particular follow one another directly in a chronological manner, in dependence upon a time interval with respect to the characterization process in order in particular to take into consideration a possible ageing and/or change of the characteristic variable that is characterized in the characterization process. In one operating mode, the control unit advantageously increases a time period between at least two operational requests, which in particular follow one another directly in a chronological manner, in dependence upon a time interval with respect to the characterization process, and in fact in particular on the basis of machine learning of the control unit in one operating mode. The term "to change" is to be understood to mean in particular to increase and/or to reduce. As a consequence, it is possible to achieve a high degree of flexibility.

The household appliance system could have for example at least the external unit that could be designed as an electrical device. For example, the external unit could be designed as a computer and/or as a further household appliance. It is preferred that the household appliance system has in particular at least the external unit which is designed as a mobile device. The term a "mobile device" is to be understood to mean in particular an electrical and/or electronic device which is provided in particular owing to the weight and/or size so as to be carried and/or to be moved, and in fact in particular during an operation and/or permanently. The mobile device has in particular at least one mobile device control unit which is provided so as to control and/or regulate at least one mobile device function and/or at least one mobile device main function. The mobile device main function differs in particular from an operation at least of one further device from a remote operating range that is arranged at a distance from the further device. The mobile device could be for example a cell phone and/or a mobile telephone and/or a smart phone and/or a laptop and/or a tablet. In particular, the mobile device differs from a remote control whose main function is in particular to operate at least one further device from a remote operating range that is arranged at a distance from the further device. As a consequence, it can be rendered possible in particular for the household appliance to be operated in a flexible manner by the external unit. In particular, the household appliance can be operated by the external unit by means of devices that are already available to the operator, as a result of which in particular it is possible to achieve low costs for an operator and/or a small number of devices.

Moreover, it is proposed that the external unit is provided so as during the operation of the household appliance to transmit to the household appliance at least one identification signal, in particular jointly with the operating signal and/or advantageously in addition to the operating signal. In one operating mode, the external unit transmits to the household appliance in particular at least one identification signal during the operation of the household appliance. For example, the external unit could transmit the identification signal jointly with the operating signal, such as for example as a modulated signal and/or as a signal that is integrated in the operating signal. In one operating mode, the external unit transmits the identification signal in particular in addition to the operating signal, such as for example as a signal that is independent of and/or separate to the operating signal. As a consequence, it is possible to achieve in particular a simple identification of the external unit, whereby it is rendered possible to operate the household appliance by the external unit in a rapid and/or failure-free and/or precise manner.

In addition, it is proposed that the control unit is provided so as in dependence upon the identification signal to differentiate different external units from one another during the operation of the household appliance. In particular, in one operating mode, the control unit in dependence upon the identification signal differentiates different external units from one another during the operation of the household appliance. As a consequence, it is possible in particular to differentiate different external units from one another in a simple and/or reliable manner, whereby in particular it is possible to achieve a simple and/or straightforward and/or uncomplicated design.

For example, the control unit could be integrated in particular at least in part, advantageously at least to a large extent and particularly advantageously fully, in the external unit. It is preferred that the household appliance system has in particular at least the household appliance in which the control unit is integrated at least in part, advantageously at least to a large extent and particularly advantageously fully. As a consequence, it is possible to achieve in particular a compact design and/or a small variety of components.

The household appliance could be designed for example as a cleaning appliance and/or as a refrigeration appliance. Advantageously, the household appliance is designed as a cooking appliance and in particular as an induction cooking appliance. It is preferred that the household appliance is a hob and in particular is designed as an induction hob. As a consequence, it is possible to achieve a high degree of operating convenience, and in fact in particular when cooking and/or preparing foodstuffs.

In addition, it is proposed that the characterization process has at least one signal calibration process which is provided so as to calibrate at least one signal of the external unit. In particular, the signal calibration process is provided so as to calibrate the operating signal of the external unit. The signal that is to be calibrated is in particular the operating signal. For example as an alternative or in addition thereto, the signal that is to be calibrated is in particular the identification signal. In particular, the signal of the external unit could be calibrated by means of the signal calibration process. In one operating mode, the control unit calibrates in particular the signal of the external unit by means of the signal calibration process. As a consequence, it is possible in particular to render possible a low susceptibility to failures and/or an optimal signal strength during the operation of the household appliance by the external unit, whereby in particular is possible to provide a convenient operation of the household appliance by the external unit. For example, it could be possible on the basis of the signal calibration process to define different arrangement ranges which could define in particular an arrangement of the external unit relative to the household appliance, whereby it is possible in particular to optimally fulfill and/or comply with the legal requirements. The arrangement ranges could be for example the operating range and/or the monitoring range.

Furthermore, it is proposed that the control unit is provided so as when performing the signal calibration process to take into consideration at least one orientation of the external unit relative to the household appliance. In particular, in one operating mode, the control unit when performing the signal calibration process takes into consideration at least one orientation of the external unit relative to the household appliance. The term an "orientation" of the external unit relative to the household appliance is to be understood to mean a position of the external unit relative to the household appliance and/or an orientation of the external unit relative to the household appliance. As a consequence, the household appliance can be operated in a precise and/or reliable manner in particular independently of an orientation of the external unit relative to the household appliance, whereby in particular it is possible to provide a high degree of operating convenience. In particular, it is possible, and in fact independently of the orientation of the external unit relative to the household appliance, to provide an optimal statement as to whether the external unit is arranged within the operating range, whereby it is possible to ensure in particular a high safety standard.

Moreover, it is proposed that the control unit is provided so as when performing the signal calibration process to take into consideration at least one distance of the external unit relative to the household appliance. In particular, in one operating mode, the control unit takes into consideration when performing the signal calibration process at least one distance of the external unit relative to the household appliance. As a consequence, it is possible to achieve in particular an optimized calibration of the signal of the external unit, whereby it is possible to achieve a precise and/or reliable operation of the household appliance by the external unit.

For example, the control unit could be provided so as when performing the signal calibration process to take into consideration at least one direction in which the external unit is arranged relative to the household appliance. In particular, in one operating mode, the control unit takes into consideration, when performing the signal calibration process, at least one direction in which the external units is arranged relative to the household appliance. As a consequence, it is possible in particular to achieve a particularly high degree of operating convenience.

Furthermore, it is proposed that the characterization process has at least one range definition process which is provided so as to define at least one operating range within which the household appliance can be operated by the external unit. In particular, the operating range can be defined by means of the range definition process. In one operating mode, the control unit defines in particular the operating range by means of the range definition process. As a consequence, it is possible in particular to limit an operation of the household appliance to an optimally defined operating range, whereby in particular it is possible to achieve in particular a high degree of safety advantageously by fulfilling legal requirements. The operating range can be calibrated and/or defined in particular in a safe and/or optimal and/or failure-unsusceptible and/or stable manner.

Moreover, it is proposed that the control unit is provided so as when performing the range definition process to take into consideration at least one layout of a room in which the household appliance is arranged. The control unit takes into consideration when performing the range definition process at least one layout of a room in which the household appliance is arranged. The term a "layout" of a room is to be understood to mean in particular a floor plan of the room and/or furnishings of the room and/or an arrangement of furnishings of the room. The term "furnishings" of a room is to be understood to mean in particular furniture and/or pieces of furniture and/or devices and/or household appliances and/or decoration. As a consequence, it is possible to adapt the operating range in particular in an optimal manner to existing conditions of the room, whereby it is possible to achieve in particular a high degree of flexibility and/or a perfectly adapted operating range.

The household appliance system could have for example at least one range sensor unit which could be provided so as to detect at least one and advantageously at least the layout of the room and which could be arranged at least in part and advantageously at least to a large extent on the household appliance and/or could be integrated in the household appliance. In particular, the control unit could take into consideration the detected layout when performing the range definition process. It is preferred that the control unit is provided so as, while performing the range definition process, in particular by means of the operator interface, to output from a catalogue of layouts for selection at least one layout of a room and advantageously of the room, in which the household appliance is arranged. When performing the range definition process, the control unit outputs, in particular by means of the operator interface, from a catalogue of layouts for selection in particular at least one layout of a room and advantageously of the room in which the household appliance is arranged. The catalogue of layouts could be deposited and/or stored for example in the database. For example as an alternative or in addition thereto, the catalogue of layouts could be deposited and/or stored in the storage unit of the control unit. Advantageously, the catalogue of layouts has a number of other at least two, in particular of at least three, advantageously of at least four, particularly advantageously of at least six, preferably of at least ten and particularly preferably of a multiplicity of different layouts which in each case differ from one another in at least one characteristic. As a consequence, it is possible to provide in particular an optimal operating convenience while simultaneously taking into consideration a large portion of possible layouts. In particular, it is to be considered expedient to provide and/or output the catalogue of layouts for selection, since in particular there is a limited number of layouts and/or since layouts that are commercially available are to a great extent of a similar design and/or are based on the same fundamental principles and/or fundamental layouts.

The catalogue of layouts could be managed for example centrally, for example in the event that it is deposited and/or stored in the database. For example, the catalogue of layouts could be expanded in particular by the control unit and in fact in particular by adding at least a further layout to the catalogue of layouts. In particular, the control unit could deposit and/or store the further layout in the database and/or in the storage unit and, in particular in addition, advantageously make this available to further operators. It is preferred that the control unit is provided so as in dependence upon at least one operator input to add to the catalogue, in particular by means of the operator interface, at least one further layout of a room. In particular, in one operating mode, the control unit in dependence upon at least one operator input adds at least one further layout of a room to the catalogue, and in fact in particular by means of the operator interface. The operator input could comprise for example at least one manual input, in particular by means of the operator interface, by means of which an operator in particular freely and/or flexibly designs the further layout in particular by altering and/or inserting and/or positioning the floor plan of the room and/or furnishings of the room. For example as an alternative or in addition thereto, the operator input could comprise for example at least one optical input, in particular by means of the operator interface, by means of which the control unit in particular in dependence upon the operator input detects the further layout by means of the range sensor unit and adds it in particular to the catalogue of layouts. For example as an alternative or in addition thereto, the operator input could for example comprise at least one data-based input, in particular by means of the operator interface, by means of which the control unit analyses in particular at least one image and/or recording and/or photograph and/or a video which have been recorded by an operator and in particular in dependence upon the analysis determines the further layout and adds it in particular to the catalogue of layouts. As a consequence, it is possible to achieve in particular a high degree of flexibility and/or an optimal range definition process for each feasible design, whereby it is possible to achieve in particular for each layout an optimal operation of the household appliance by the external unit.

Furthermore, it is proposed that the control unit is provided so as when performing the range definition process to output, in particular by means of the operator interface, at least one operational request for at least one actuating signal to be transmitted to the control unit from at least a part region of the room by the external unit. In particular, when performing the range definition process, the control unit outputs, in particular by means of the operator interface, at least one operational request for at least one actuating signal to be transmitted to the control unit from at least a part region of the room by the external unit. The part region of the room is located in particular within the room and is designed in particular as a part and/or section of the room and consequently is in particular smaller than the room. The part region of the room could be for example a position within the room and/or an immediate vicinity of a position within the room. For example, an immediate vicinity of an object of the room when viewed in a perpendicular direction to a floor of the room could have a distance from the object of a maximum 25%, in particular of a maximum 20%, advantageously of a maximum 15%, particularly advantageously of a maximum 10%, preferably of a maximum 5% and particularly preferred of a maximum 3% of a maximum extent of a wall that defines the room. The part region of the room could be advantageously a marked region of the room. When performing the range definition process, the control unit takes into consideration in particular at least two, advantageously at least three, particularly advantageously at least four, preferably at least five and particularly preferably at least six part regions of the room. In particular, when performing the range definition process, the control unit takes into consideration a maximum thirty, in particular a maximum twenty-five, advantageously a maximum twenty, particularly advantageously a maximum fifteen, preferably a maximum twelve and particularly preferably a maximum ten part regions of the room. As a consequence, is possible to achieve in particular a precise and/or optimum definition of the operating range, whereby it is possible to provide in particular a high degree of operational convenience and/or an optimal operation of the household appliance by the external unit.

Moreover, it is proposed that the part region is a corner region within the room. The term a "corner region" of a room is to be understood to mean in particular an immediate vicinity of a corner of the room and/or an immediate vicinity of a corner of furnishings that are arranged within the room, in particular an immediate vicinity of a corner of a piece of furniture that is arranged within the room. As a consequence, it is possible to define in an optimal manner in particular an operating range, whereby it is possible in particular to achieve in particular a safe and/or reliable and/or convenient operation of the household appliance by the external unit.

For example, when performing the range definition process, the control unit could output, in particular by means of the operator interface, at least one operational request for at least one variable and/or at least one area extent of the layout of the room and/or of the room to be input. Advantageously, when performing the range definition process, the control unit automatically determines at least one variable and/or at least one area extent of the layout of the room and/or of the room and in fact in particular in dependence upon the selection of the layout and/or in dependence upon the actuating signal.

The control unit is provided in particular so as in dependence upon a selected layout of the room to automatically determine the part region. In particular, when performing the range definition process, the control unit automatically determines the part region in dependence upon a selected layout of the room. As a consequence, it is possible to achieve in particular a high degree of convenience for an operator who in particular can be relieved of the effort involved in selecting the part region.

For example, in one operating mode, the control unit could perform the range definition process chronologically prior to the signal calibration process. It is preferred that the control unit is provided so as to perform the signal calibration process chronologically prior to the range definition process. In one operating mode, the control unit performs in particular the signal calibration process chronologically prior to the range definition process. As a consequence, the processes can be performed in particular in an optimized sequence, whereby it is possible, in particular owing to the signal calibration that has already been performed, to optimally define the operating range.

A particularly high degree of operational convenience can be achieved in particular by a household appliance, in particular by a hob, of a household appliance system in accordance with the invention.

An operational convenience can be further increased in particular by a method for operating a household appliance system in accordance with the invention, whereby in one operating mode a check is performed automatically at least in intervals as to whether an external unit for operating at least one household appliance is arranged in an operating range and in the event that the external unit is arranged within the operating range, the operation of the household appliance by the external unit is enabled.

It is possible in particular to provide an improved and/or optimized operational convenience by way of a method for operating a household appliance system in accordance with the invention, whereby at least one characterization process is performed and after completion of the characterization process an operation at least of one household appliance by at least one external unit is enabled.

The household appliance system is not to be limited to the above described application and embodiment. In particular, the household appliance system can have a number of individual elements, components and units that differs from the number thereof mentioned herein.

Further advantages are apparent from the following description of the drawing. Exemplary embodiments of the invention are illustrated in the drawing. The drawing, the description and the claims contain numerous features in combination. The person skilled in the art will also expediently consider the features individual and combine them to form expedient further combinations.

DETAILED DESCRIPTION OF EXEMPLARY EMBODIMENTS OF THE PRESENT INVENTION

Figure 1:
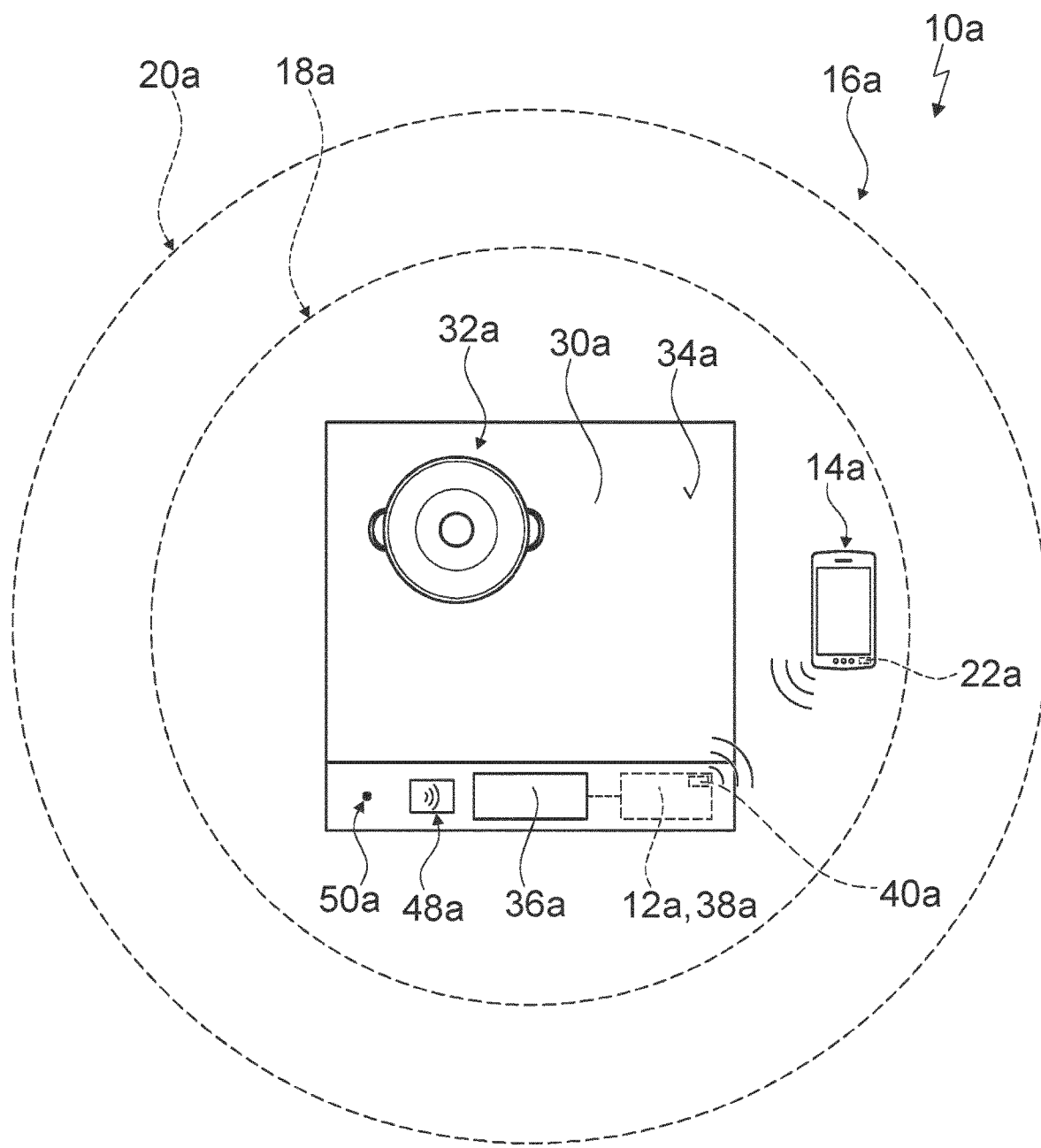
FIG. 1 shows a household appliance system having a household appliance, having a control unit, having an operator interface, having a sensor unit and having an external unit, in a schematic plan view

FIG. 1 illustrates by way of example a household appliance system 10a which is designed in particular as an induction household appliance system. The household appliance system 10a has in particular at least one and advantageously precisely one household appliance 16a. The household appliance 16a is designed and/or provided and/or suitable in particular especially for the household appliance system 10a.

For example, the household appliance system 10a could be designed as a cleaning appliance system and/or as a refrigeration appliance system. In particular, the household appliance 16a could be designed as a cleaning appliance, such as for example as a dryer and/or as a washing machine and/or as a dishwasher. For example as an alternative or in addition thereto, the household appliance 16a could be designed in particular as a refrigeration appliance, such as for example as a refrigerator and/or as a freezer.

Advantageously, the household appliance system 10a is designed as a cooking appliance system and particularly advantageously as an induction cooking appliance system.

The household appliance 16a could be designed for example as an oven and/or as a microwave and/or as a grilling appliance and/or as a steam cooking appliance. The oven could be for example a cooker and/or a baking oven.

In the present exemplary embodiment, the household appliance system 10a is designed advantageously as a cooking system and particularly advantageously as an induction cooking system. Advantageously, the household appliance 16a is designed as a hob and particularly advantageously as an induction hob.

The household appliance 12a has in particular at least one and advantageously precisely one appliance plate 30a. In particular, in one operating mode, the appliance plate 30a forms at least one part at least of an appliance housing, in particular at least of an appliance outer housing, advantageously of the household appliance 16a. In one operating mode, the appliance plate 30a forms in particular at least one visible side and/or visible surface that faces in particular at least one operator. In one operating mode, the appliance plate 30a is arranged facing in particular an operator.

In the present exemplary embodiment, the appliance plate 30a is designed in particular as a plate on which kitchenware is placed. For example, the appliance plate 30a could be designed as a hob plate and/or as a work plate, in particular as a kitchen work plate. The appliance plate 30a is provided in particular for placing cookware 32a on it, in particular for heating cookware 32a.

The appliance plate 30a defines in particular at least one and advantageously precisely one cooking area 34a. The cooking area 34a is designed in particular as a surface of the appliance plate 30a that is facing an operator and in at least one operating mode in particular at least one heating unit (not illustrated) is arranged below said cooking area.

The household appliance 16a has in particular at least one and advantageously at least the heating unit. In the present exemplary embodiment, the household appliance 16a has for example at least two, particularly at least four, advantageously at least eight, particularly advantageously at least twelve, preferably at least sixteen and particularly preferably a multiplicity of heating units. Advantageously, the heating units are arranged in the form of a matrix and can be combined in particular to form a flexible definition and/or formation of heating zones, in particular by at least one household appliance control unit 38a. By way of example, only one of the heating units is described below.

The heating unit is designed in particular as an induction heating unit. The heating unit is arranged in an installed position in particular below the cooking appliance plate 30a. The heating unit is provided in particular so as to heat cookware 32a that is placed on the cooking appliance plate 30a above the heating unit.

The household appliance system 10a has in particular at least one and advantageously precisely one external unit 14a. The external unit 14a and the household appliance 16a are in particular different objects from one another. For example, the external unit 14a is designed as a computer. In the present exemplary embodiment, the external unit 14a is designed as a mobile device. The external unit 14a is designed in particular as a cell phone and/or as a smart phone and/or as a mobile telephone. For example as an alternative, the external unit 14a could be designed as a tablet and/or as a laptop.

The household appliance system 10a has in particular at least one and advantageously precisely one operator interface 36a. The operator interface 36a is provided in particular so as to input and/or select operating parameters, such as for example at least one heating power and/or at least one heating power density and/or at least one heating zone and/or at least one temperature and/or at least one appliance parameter at least of an appliance function. The operator interface 36a is provided in particular so as to output, for example, a value at least of one operating parameter and/or at least of one piece of information and/or at least of one operational request in particular to an operator.

The operator interface 36a could be integrated for example at least in part, in particular at least to a large extent and advantageously fully, in the external unit 14a. For example as an alternative or in addition thereto, the operator interface 36a could be integrated in particular at least in part in the external unit 14a and at least in part in the household appliance 16a. In the present exemplary embodiment, the operator interface 36a is integrated advantageously at least in part, particularly advantageously at least to a large extent and preferably fully, in the household appliance 16a.

The household appliance 16a has in particular at least one and advantageously precisely one household appliance control unit 38a. In the operating mode, the household appliance control unit 38a controls and/or regulates in particular at least one household appliance function and advantageously at least one household appliance main function. The household appliance control unit 38a is provided in particular so as in dependence upon operating parameters that are input by means of the operator interface 36a to perform actions and/or to change settings. In one operating mode, the household appliance control unit 38a controls and/or regulations in particular an energy supply to the heating unit.

The household appliance system 10a has in particular at least one and advantageously precisely one control unit 12a.

In one operating mode, the control unit 12a controls and/or regulates in particular an operation of the household appliance 16a by the external unit 14a.

The control unit 12a could be integrated for example at least in part, in particular at least to a large extent and advantageously fully, in the external unit 14a. For example as an alternative or in addition thereto, the control unit 12a could be integrated in particular at least in part in the external unit 14a and at least in part in the household appliance 16a. In the present exemplary embodiment, the control unit 12a is integrated advantageously at least in part, particularly advantageously at least to a large extent and preferably fully, in the household appliance 16a.

The control unit 12a has in particular the household appliance control unit 38a. In particular, the control unit 12a and the household appliance control unit 38a are designed as one piece.

The control unit 12a and the external unit 14a are provided in particular so as to communicate in particular in a wireless manner. In particular, the external unit 14a and the household appliance 16a are provided so as to communicate in particular in a wireless manner. For example, the external unit 14a and the household appliance 16a could communicate with one another in one operating mode by means of ultrasound and/or by means of acoustic waves and/or by means of near field communication and/or by means of radio technology. In particular in the case of communication by means of ultrasound and/or by means acoustic waves, communication between the external unit 14a and the household appliance 16a could be limited in particular to a range within a room 26a, since in particular acoustic waves could be greatly attenuated by the walls.

In one operating mode, the control unit 12a automatically checks at least in intervals whether the external unit 14a for operating the household appliance 16a is arranged within an operating range 18a. In the present exemplary embodiment, the control unit 12a checks over a time period of at least 5 min, in particular of at least 1 min, advantageously of at least 15 min, particularly advantageously of at least 20 min, preferably of at least 25 min and particularly preferably of at least 28 min, whether the external unit 14a for operating the household appliance 16a is arranged in the operating range.

The operating range 18a is illustrated by way of example in FIG. 1. In particular, the household appliance 16a is arranged within the operating range 18a. The operating range 18a extends, in particular when viewed in a perpendicular direction to a main extent plane of a floor of a room 26a in which the household appliance 16a is arranged, in particular at least in part around the household appliance 16a.

In particular, the household appliance 16a can be operated by the external unit 14a in particular owing to legal requirements in the event that the external unit 14a is arranged within the operating range 18a. In one operating mode, the control unit 12a enables the operation of the household appliance 16a by the external unit 14a in the event that the external unit 14a is arranged in the operating range 18a.

In particular in one operating mode, the control unit 12a blocks the operation of the household appliance 16a by the external unit 14a in the event that the external unit 14a is arranged outside the operating range 18a and consequently in particular has a greater distance from the household appliance 16a than when the external unit 14a is arranged within the operating range 18a.

In the event that the external unit 14a is arranged outside the operating range 18a and within a monitoring range 20a, the control unit 12a in one operating mode blocks the operation of the household appliance 16a by the external unit 14a and enables the monitoring of the household appliance 16a by the external unit 14a.

The monitoring range 20a is in particular arranged directly adjacent to the operating range 18a and advantageously adjoins the operating range 18a in particular in a direction that faces away from the household appliance 16a. Advantageously, the monitoring range 20a surrounds the operating range 18a at least in part and is arranged in particular at least in part around the operating range 18a.

In the event that the external unit 14a is arranged outside the operating range 18a and outside a monitoring range 20a, the control unit 12a in one operating mode blocks the operation of the household appliance 16a by the external unit 14a and the monitoring of the household appliance 16a by the external unit 14a.

The control unit 12a takes into consideration during the automatic check in particular at least one distance measurement of the external unit 14a to at least one point of the household appliance 16a. In particular, the control unit 12a during the automatic check carries out in particular the distance measurement of the external unit 14a to the point of the household appliance 16a and/or at least initiates the distance measurement.

In the present exemplary embodiment, the distance measurement is designed in particular as a signal strength measurement. In particular, the control unit 12a during the automatic check carries out the distance measurement of the external unit 14a to the point of the household appliance 16a by means of at least one signal strength measurement. During the signal strength measurement, the control unit 12a detects and/or determines in particular a signal strength at least of one signal that is transmitted by the external unit 14a.

In particular, the control unit 12a takes into consideration during the automatic check at least one signal strength measurement at least of one operating signal that is transmitted by the external unit 14a to the household appliance 16a. In one operating mode, the control unit 12a in particular in dependence upon the signal strength measurement enables the operation of the household appliance 16a by the external unit 14a or blocks the operation of the household appliance 16a by the external unit 14a.

In particular in dependence upon a comparison of the operating signal that is received in particular by the external unit 14a with at least one operating signal reference range, the control unit 12a decides whether to enable and/or to block the operation of the household appliance 16a by the external unit 14a. In particular, the control unit 12a in one operating mode compares the operating signal that is received in particular by the external unit 14a with at least one operating signal reference range.

The control unit 12a has in particular at least one storage unit 40a. In particular at least the operating signal reference range is deposited and stored in the storage unit 40a.

In one operating mode in particular in the event that the operating signal 18a is arranged within the operating signal reference range, the control unit 12a enables the operation of the household appliance 16a by the external unit 14a. In one operating mode, the control unit 12a blocks the operation of the household appliance 16a by the external unit 14a in particular in the event that the operating signal 18a is arranged outside the operating signal reference range.

In particular, the control unit 12a in one operating mode automatically checks in a chronologically reoccurring manner whether the external unit 14a for operating the household appliance 16a is arranged in the operating range 18a. In the present exemplary embodiment, the control unit 12a automatically checks, in particular at regular time intervals of a maximum 300 s, in particular of a maximum 100 s, advantageously of a maximum 50 s, particularly advantageously of a maximum 30 s, preferably of a maximum 10 s and particularly preferably of a maximum 5 s, whether the external unit 14a for operating the household appliance 16a is arranged in the operating range 18a.

In particular in addition to the chronologically reoccurring automatic check, the control unit 12a in one operating mode automatically checks in dependence upon at least one movement characteristic variable of the external unit 14a whether the external unit 14a for operating the hha16a is arranged in the operating range 18a. In one operating mode, the control unit 12a detects and/or determines in particular the movement characteristic variable of the external unit 14a by means of at least one sensor unit 22a.

The household appliance system 10a has in particular at least one and advantageously precisely one sensor unit 22a, in particular at least the and advantageously precisely the sensor unit 22a. The sensor unit 22a is provided in particular so as to detect the movement characteristic variable of the external unit 14a. In one operating mode, the sensor unit 22a detects, in particular in dependence upon a control being performed by the control unit 12a, in particular the movement characteristic variable of the external unit 14a.

In the present exemplary embodiment, the control unit 22a is integrated advantageously at least in part, particularly preferably advantageously at least to a large extent and preferably fully in the external unit 14a.

The control unit 12a determines in one operating mode in dependence upon the movement characteristic variable at least in part an arrangement of the external unit 14a relative to the household appliance 16a. In one operating mode, the control unit 12a determines an arrangement of the external unit 14a relative to the household appliance 16a both in dependence upon the movement characteristic variable and also in dependence upon an original arrangement of the external unit 14a relative to the household appliance 16a.

In particular owing to legal requirements and advantageously so as to comply with legal requirements, the control unit 12a in one operating mode automatically outputs in a chronologically reoccurring manner, in particular by means of the operator interface 36a, at least one operating request for confirmation that the external unit 14a is arranged in the operating range 18a. In the present exemplary embodiment, the control unit 12a in one operating mode outputs, in particular by means of the operator interface 36a, at regular time intervals of at least essentially 30 min, the operational request for confirmation that the external unit 14a is arranged in the operating range 18a.

The control unit 12a is provided in particular so as to perform at least one characterization process. In one operating mode, the control unit 12a performs, in particular by an operator, in particular the characterization process. In particular after completion of the characterization process, the control unit 12a is provided so as to enable the operation of the household appliance 16a by the external unit 14a. In one operating mode, the control unit 12a performs the characterization process chronologically prior to the operation of the household appliance 16a by the external unit 14.

In one operating mode, the control unit changes a time period between at least two operational requests, in particular for confirmation that the external unit 14a is arranged within the operating range 18a, in dependence upon a time interval to the characterization process. In the present exemplary embodiment, in one operating mode, the control unit 12a increases the time period between two operational requests, in particular for confirmation that the external unit 14a is arranged in the operating range 18a, in dependence upon a time interval to the characterization process, and in fact in particular owing to a decision regarding the blocking and/or enabling of the operation of the household appliance 16a by the external unit 14a being optimized and/or improved as a result of machine learning and/or an increased efficiency.

In particular chronologically prior to the operation of the household appliance 16a by the external unit 14, the control unit 12a in one operating mode performs, in particular by an operator, in particular the characterization process. The characterization process is provided in particular so as to characterize at least one characteristic variable and/or at least one object which is essential and/or plays at least a central role during the operation of the household appliance 16a by the external unit 14a.

In the present exemplary embodiment, the characterization process is provided in particular so as to characterize the external unit 14a, in particular at least of one signal of the external unit 14a, advantageously at least of one operating signal of the external unit 14a, and/or so as to characterize the operating range 18a.

The characterization process has, in particular for each external unit 14a, in particular at least one and advantageously precisely one signal calibration process. In particular, the signal calibration process is provided so as to calibrate at least one signal of the external unit 14a, advantageously at least one operating signal of the external unit 14a. In one operating mode, the control unit 12a calibrates in particular in the signal calibration process the signal of the external unit 14a, advantageously the operating signal of the external unit 14a.

In particular, the control unit 12a in one operating mode performs the signal calibration process by means of the following formula:

$$RSSI = -10n\lg\left(\frac{d}{d_0}\right) + A + X_\sigma$$

In said formula, RSSI in particular represents a received signal strength of the signal that is transmitted by the external unit 14a. The signal strength RSSI indicates in particular a signal strength of the signal that is transmitted by the external unit 14a in the case of a distance d of the external unit 14a relative to the household appliance 16a.

In particular, n represents a dimensionless variable which in particular in the free space could assume for example a value of at least essentially two. In the formula, d represents in particular a distance of the external unit 14a relative to the household appliance 16a. In particular, do represents a defined distance of the external unit 14a relative to the household appliance 16a which could assume in particular a value of at least essentially 1 m. Xō is in particular a variable which characterizes a background noise and which could on average assume in particular a value of at least essentially zero.

The parameter A is in particular a parameter that is dependent upon an embodiment and/or upon a type of the external unit 14a. In particular, the control unit 12a during the course of the signal calibration process determines the parameter A in order to calibrate in particular the external unit 14a.

During the course of the signal calibration process, the control unit 12*a* outputs, in particular by means of the operator interface 36*a*, in particular at least one operational request for the external unit 14*a* to be arranged in a distance do relative to the point of the household appliance 16*a*. For example, the control unit 12*a* could, in particular by means of the operator interface 36*a*, perform the arrangement of the external unit 14*a* in the distance do relative to the point of the household appliance 16*a*. The control unit 12*a* could output for example at least one piece of information and/or at least one instruction, in particular by means of the operator interface 36*a*. For example, while performing the signal calibration process, the control unit 12*a* could output, in particular by means of the operator interface 36*a*, at least one direction in which the external unit 14*a* is to move, and/or a position at which the external unit 14*a* is to be arranged.

For example as an alternative or in addition thereto, while performing the signal calibration process, the control unit 12*a* could support for example the arrangement of the external unit 14*a* in the distance do relative to the point of the household appliance 16*a* by means of near field communication, such as for example by means of at least one tag 48*a* and/or by means of at least one label which could be integrated in particular at least to a large extent in the household appliance 16*a*.

For example as an alternative or in addition thereto, while performing the signal calibration process, the control unit 12*a* could support in particular the arrangement of the external unit 14*a* in the distance do relative to the point of the household appliance 16*a* by means of at least one light signal. The household appliance system 10*a* could have for example at least one light source 50*a* which could be integrated for example at least to a large extent in the household appliance 16*a*. The control unit 12*a* could be provided in particular so as to control and/or regulate the light source 50*a*. In particular, while performing the signal calibration process, the control unit 12*a* could output at least one, in particular bundled, light beam, for example in the color red, and in particular output at least one operational request for the external unit 14*a* to be arranged in a center of the light beam, and in particular for the external unit 14*a* to be moved parallel to the light beam until the external unit 14*a* is arranged in the desired distance relative to the household appliance 16*a*.

While performing the signal calibration process, the control unit 12*a* takes into consideration in particular at least one distance of the external unit 14*a* relative to the household appliance 16*a*. In particular in the case of an arrangement of the external unit 14*a* in the distance do relative to the point of the household appliance 16*a*, the control unit 12*a* determines the parameter A that is characteristic for the external unit 14*a* and calibrates therewith the external unit 14*a*.

In one operating mode, the control unit 12*a* stores in particular the calibration of the external unit 14*a* for use later, in particular during an operation of the household appliance 16*a* by the external unit 14*a*. In particular following the characterization process, the control unit 12*a* uses as a basis in particular at least of a communication of the external unit 14*a*, for example with the control unit 12*a* and/or with the household appliance 16*a*, a result of the characterization process, in particular of the signal calibration process, advantageously the calibrated value of the parameter A.

In particular in addition to taking into consideration the distance of the external unit 14*a* relative to the household appliance 16*a*, while performing the signal calibration process, the control unit 12*a* takes into consideration in particular at least one orientation of the external unit 14*a* relative to the household appliance 16*a*.

For example, the control unit 12*a* in one operating mode could store a result of the signal calibration process separately for each orientation of the external unit 14*a* relative to the household appliance 16*a*. The control unit 12*a* could, in particular as an alternative or in addition thereto, store at least a maximum value and/or at least a minimum value and/or at least one average value of a result of the signal calibration process for each orientation of the external unit 14*a* relative to the household appliance 16*a*.

During the operation of the household appliance 16*a* by the external unit 14*a*, the control unit 12*a* determines a distance, which is represented in the above formula in particular as d, of the external unit 14*a* relative to the household appliance 16*a* in dependence upon a detection of a signal strength, which is represented in the above formula in particular as RSSI, of a signal that is transmitted by the external unit 14*a* and in particular in dependence upon a result of the signal calibration process, in particular in dependence upon the parameter A that is determined by the control unit 12*a*.

Figure 2:
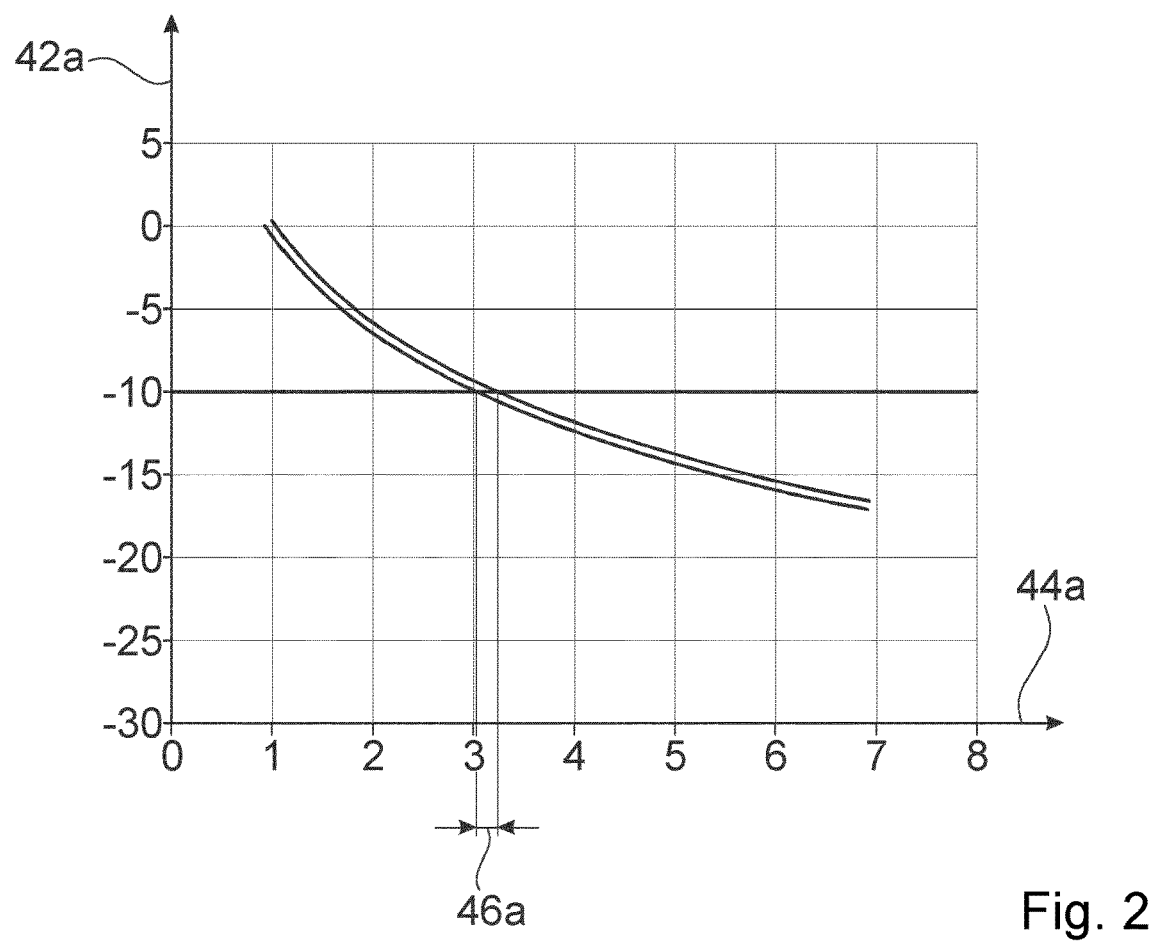
FIG. 2 shows a diagram which in which a parameter, which characterizes a signal strength of a signal that is transmitted by the external unit, is plotted over a distance of the external unit relative to the household appliance, in a schematic plan view.

FIG. 2 illustrates by way of example a diagram in which a parameter that characterizes a signal strength of a signal that is transmitted by the external unit 14*a*, is plotted over a distance of the external unit 14*a* relative to the household appliance 16*a*. In particular, a parameter which characterizes a signal strength of a signal that is transmitted by the external unit 14*a* is plotted in FIG. 2 on an ordinate axis 42*a*. In particular, a distance of the external unit 14*a* relative to the household appliance 16*a* is plotted in FIG. 2 on an abscissa axis 44*a*.

In particular, two curves are plotted in FIG. 2 which are to be assigned to two mutually different external units 14*a* that could differ in particular in at least one characteristic and could for example be of a different type and/or or a different design. The external units 14*a* are arranged in particular at the same distance relative to the household appliance 16*a*. It is particularly apparent in FIG. 2 that the control unit 12*a* in one operating mode, in particular on the basis of the signal calibration process, determines a distance of the external units 14*a* with a difference 46*a* of a maximum 0.2 m, whereby it is possible to achieve in particular an optimum operation of the household appliance 16*a* by the external unit 14*a* and/or achieve a particularly high degree of accuracy when determining the distance of the external units 14*a* relative to the household appliance 16*a*.

The characterization process has, in particular in addition to the signal calibration process, at least one and advantageously precisely one range definition process. In particular, the range definition process is provided so as to define the operating range 18*a* within which the household appliance 16*a* can be operated by the external unit 14*a*. In one operating mode, the control unit 12*a* defines in particular in the range definition process the operating range 18*a* within which the household appliance 16*a* can be operated by the external unit 14*a*.

When performing the range definition process, the control unit 12*a* takes into consideration in particular at least one layout 24*a* of a room 16*a* in which the household appliance 16*a* is arranged. In particular, while performing the range definition process, the control unit 12*a* defines the operating range 18*a* in dependence upon a layout 24*a* of the room 16*a* in which the household appliance 16*a* is arranged.

Figure 3:
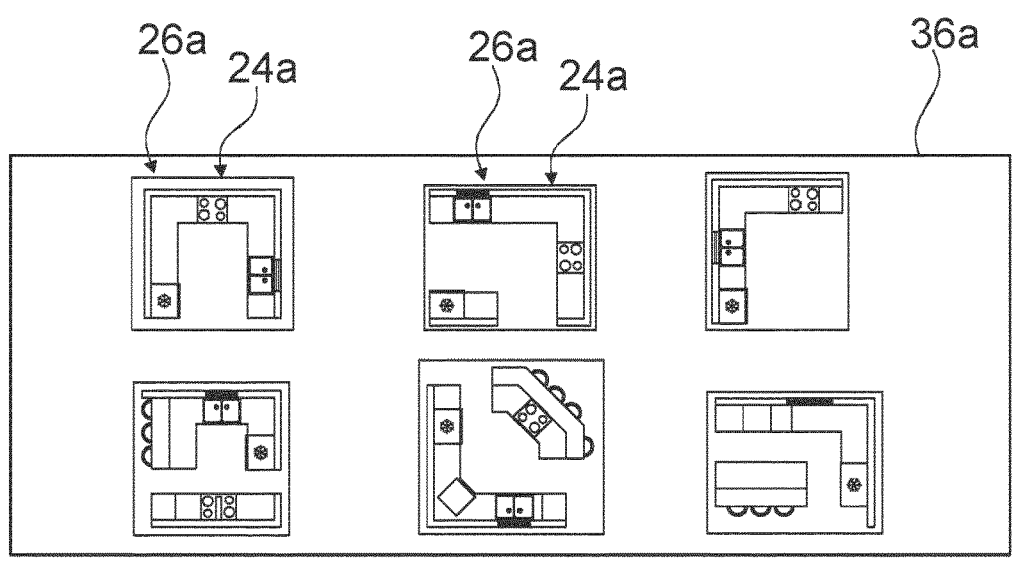
FIG. 3 shows the operator interface in one operating mode, in a schematic representation.

While performing the range definition process, the control unit 12a advantageously outputs, in particular by means of the operator interface 36a, at least one layout 24a of the room 26a in which the household appliance 16a is arranged (cf. FIG. 3) from a catalogue of layouts 24a for selection. In the present exemplary embodiment, while performing the range definition process, the control unit 12a outputs from the catalogue of layouts 14a for selection in particular multiple layouts 24a of the room 26a, in which the household appliance 16a is arranged. FIG. 3 illustrates by way of example a selection of six different layouts 24a.

In particular, while performing the range definition process, the control unit 12a outputs, in particular by means of the operator interface 36a, at least one operational request for a layout 24a to be selected from the selection of layouts 24a provided. While performing the range definition process, the control unit 12a selects in particular in dependence upon a selection of a layout 24a the selected layout 24a and henceforth uses the selected layout 24a as a basis in particular of the range definition process.

Figure 4:
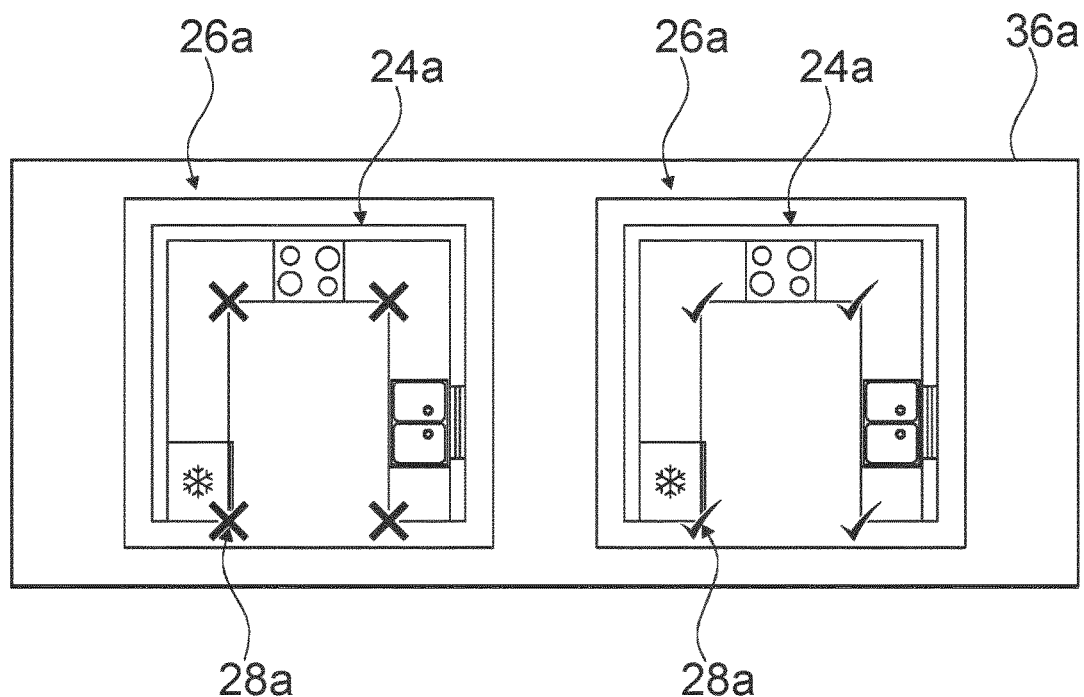
FIG. 4 shows the operator interface in a further operating mode, in a schematic representation.
Figure 5:
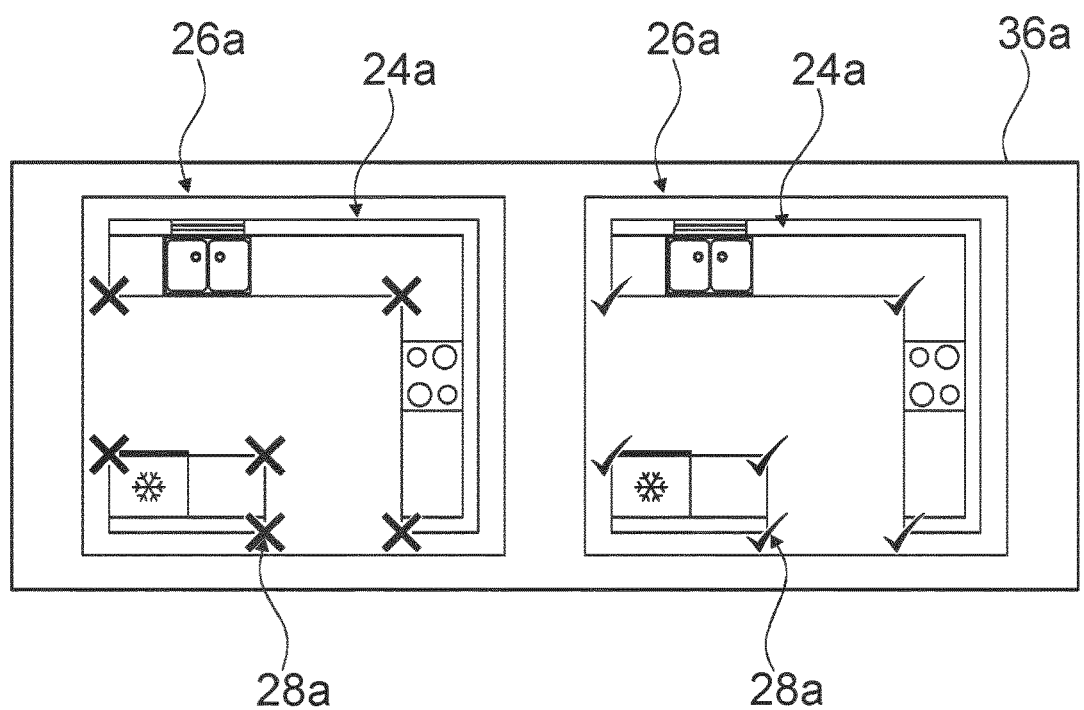
FIG. 5 shows the operator interface in a further operating mode, in a schematic representation.
Figure 6:
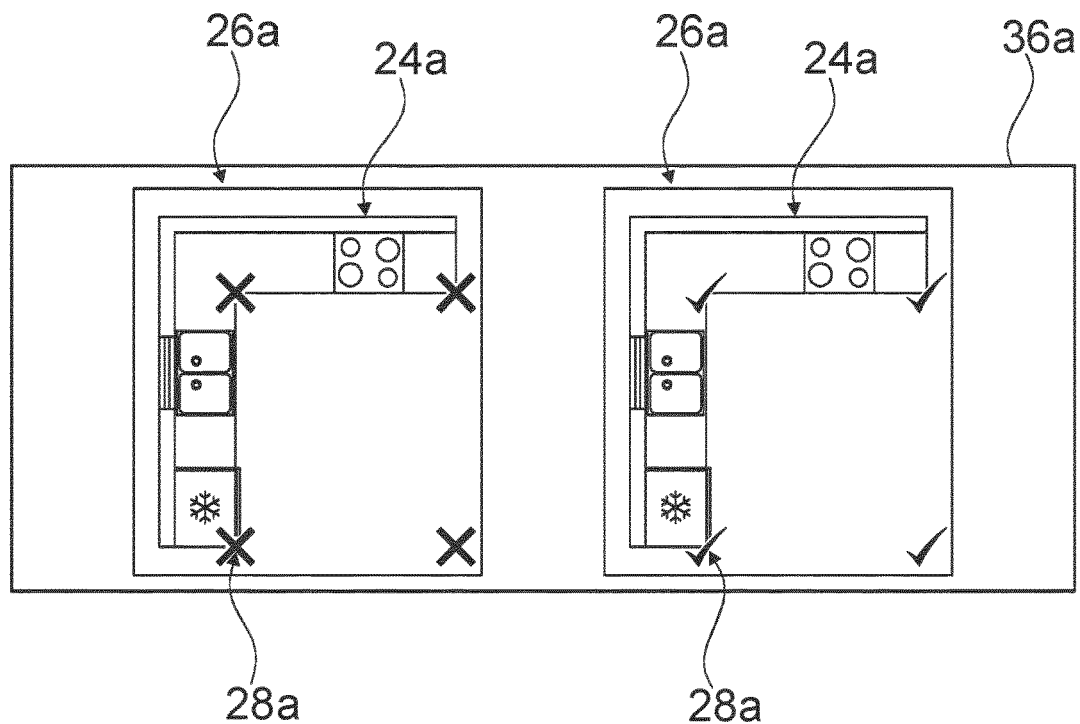
FIG. 6 shows the operator interface in a further operating mode, in a schematic representation.
Figure 7:
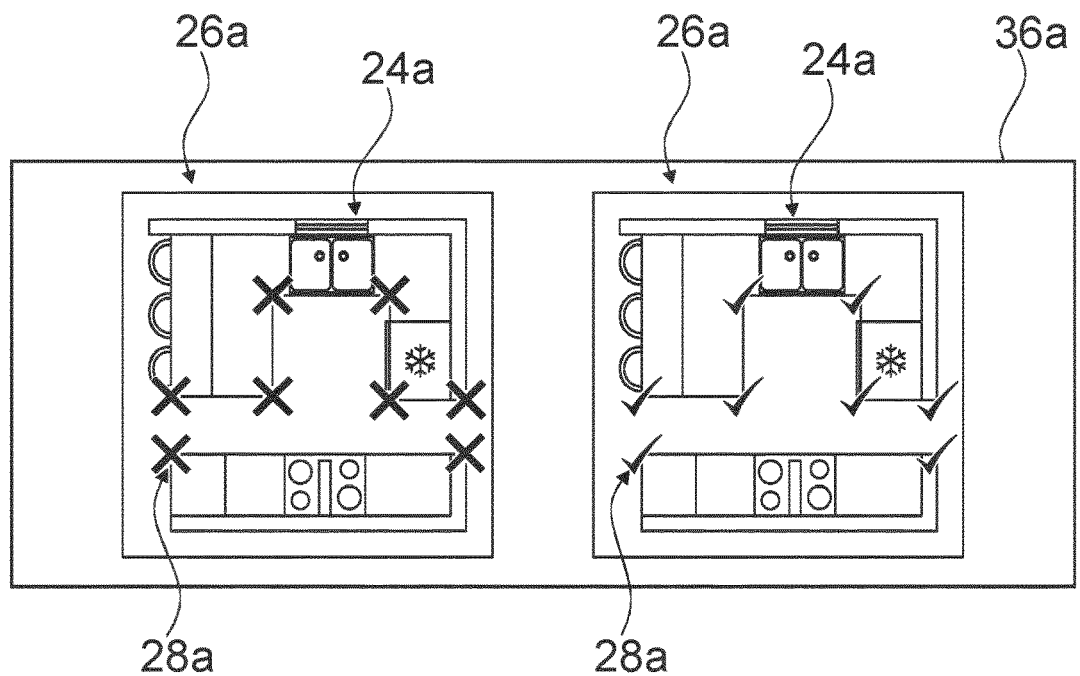
FIG. 7 shows the operator interface in a further operating mode, in a schematic representation.
Figure 8:
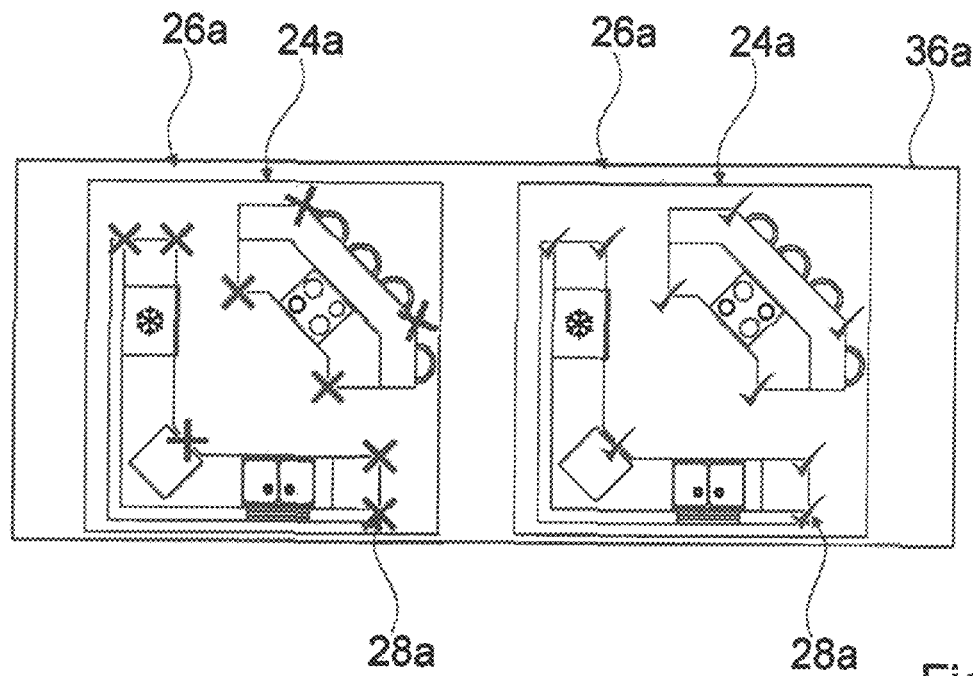
FIG. 8 shows the operator interface in a further operating mode, in a schematic representation.
Figure 9:
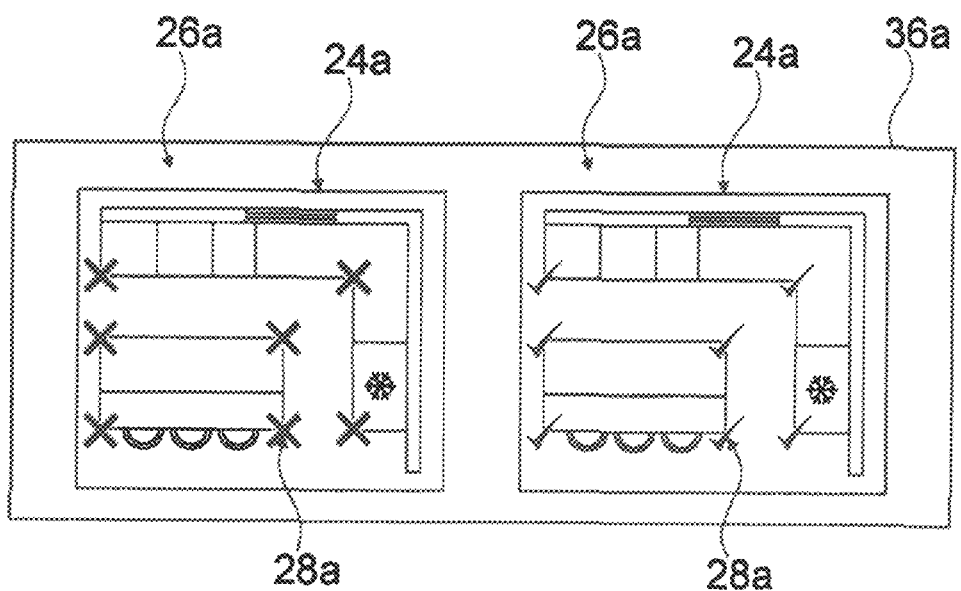
FIG. 9 shows the operator interface in a further operating mode, in a schematic representation

FIG. 4 illustrates by way of example a selected layout 24a of the layouts 14a from the catalogue of layouts 24a. In a similar manner, FIGS. 5 to 9 illustrate by way of example the further layouts 24a from the catalogue of layouts 24a. A description does however apply identically in particular for all layouts 24a and for this reason only the layout 24a that is illustrated in FIG. 4 is referred to below.

While performing the range definition process, the control unit 12a outputs, in particular by means of the operator interface 36a, in particular at least one operational request for at least one actuating signal to be transmitted to the control unit 12a from at least one part region 28a of the room 26a by the external unit 14a. In each case, only one of the multiple objects present in the figures is provided with a reference character.

In the present exemplary embodiment, while performing the range definition process, the control unit 12a outputs, in particular by means of the operator interface 36a, in particular at least one operational request for in each case at least one actuating signal to be transmitted to the control unit 12a from multiple part regions 28a of the room 26a by the external unit 14a.

In particular, while performing the range definition process, the control unit determines a number of part regions 28a of the room 26a in dependence upon a layout 24a of the room 26a. In particular only one of the part regions 28a is described below.

The part region 28a of the room 26a is in particular a distinctive region of the room 26a. Advantageously, the part region 28a of the room 26a is a corner region within the room 26a.

While performing the range definition process, the control unit 12a outputs, in particular by means of the operator interface 36a, in particular the selected layout 24a and marks in particular the part region 28a. While performing the range definition process, the control unit 12a could output for example the part region 28a chronologically prior to a transmission of the confirmation signal and/or characterize it with a different symbol to that following the transmission of the confirmation signal. For example, while performing the range definition process, the control unit 12a could output the part region 28a chronologically prior to a transmission of the confirmation signal with an X-symbol and/or characterize it following the transmission of the confirmation signal with a hook-symbol.

While performing the range definition process, the control unit 12a could for example output at least in intervals simultaneously two symbols, for example in two adjacent images of the selected layout 24a, such as is illustrated by way of example in FIG. 4. For example as an alternative or in addition thereto, the control unit 12a could output by way of example the symbols and/or layouts 24a offset with respect to one another in a chronological manner.

In particular, the control unit 12a terminates the range definition process by transmitting the confirmation signal, in particular the last confirmation signal of a part region 28a that is the last to be confirmed.

In one operating mode, the control unit 12a performs in particular the signal calibration process chronologically prior to the range definition process in order hereby to render it possible in particular to optimally define the operating range 18a.

Figure 10:
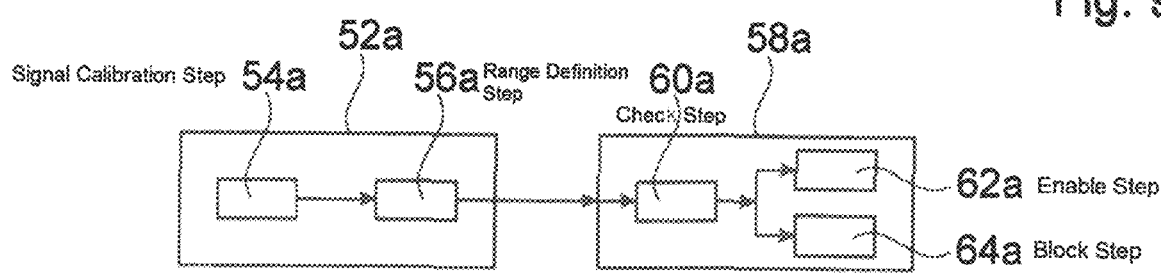
FIG. 10 shows a diagram of a method for operating the household appliance system, in a schematic representation.

In one method for operating the household appliance system 10a, at least one characterizing process is performed in particular in at least one process performance step 52a (cf. FIG. 10). In particular in a signal calibration step 54a, which is in particular a part step of the process performance step 52a, in particular the signal of the external unit 14a is calibrated. In the method, in particular in a range definition step 56a which follows the signal calibration step 54a and is in particular a part step of the process performance step 52a, in particular the operating range 18a is defined within which the household appliance 16a can be operated by the external unit 14a.

After completion of the characterization process, in particular in at least one operating step 58a, in particular an operation of the household appliance 16a by the external unit 14a is enabled, and in fact in particular in dependence upon a check as to whether the external unit 14a is arranged within the operating range 18a.

In particular in a check step 60a, which is in particular a part step of the operating step 58a, a check is automatically performed in one operating mode in particular at least in intervals as to whether the external unit 14a for operating the household appliance 16a is arranged in the operating range. In particular in an enable step 62a which is in particular a part step of the operating step 58a, the operation of the household appliance 16a by the external unit 14a is enabled in the event that the external unit 14a is arranged within the operating range 18a. In particular in a block step 64a which is in particular a part step of the operating step 58a, the operation of the household appliance 16a by the external unit 14a is blocked in the event that the external unit 14a is arranged outside the operating range 18a.

The invention claimed is:

1. A household appliance system, comprising:
   a household cooking appliance disposed in a room;
   an external unit configured to operate the household cooking appliance; and
   a control unit configured to:
      determine an operation range of the external unit based on a layout of the room;
      enable operation of the household cooking appliance by the external unit, responsive to determining the external unit is within the operation range; and
      disable operation of the household cooking appliance by the external unit, responsive to determining the external unit is outside the operation range.

2. The household appliance system of claim 1, wherein the control unit is further configured to calibrate a signal of the external unit.

3. The household appliance system of claim 2, wherein the control unit is further configured to consider an orientation of the external unit relative to the household cooking appliance when calibrating the signal of the external unit.

4. The household appliance system of claim 2, wherein the control unit is further configured to consider a distance of the external unit relative to the household cooking appliance when calibrating the signal of the external unit.

5. The household appliance system of claim 1, wherein the control unit is further configured to output a catalog of room layouts for selection by a user.

6. The household appliance system of claim 1, wherein the control unit is further configured to check at regular intervals a location of the external unit relative to the operating range.

7. The household appliance system of claim 1, wherein the external unit comprises a mobile device.

8. The household appliance system of claim 1, wherein the control unit is integrated at least in part into the household cooking appliance.

9. The household appliance system of claim 1, wherein the household cooking appliance includes a hob.

10. A method for operating a household appliance system, the method comprising:
    determining an operation range of an external unit based on a layout of a room in which a household cooking appliance is disposed;
    determining a location of an external unit;
    enabling operation of the household cooking appliance by the external unit responsive to determining the external unit is within the operation range; and
    disabling operation of the household cooking appliance by the external unit responsive to determining the external unit is outside the operation range.

11. The method of claim 10, further comprising:
    calibrating a signal of the external unit, taking into consideration an orientation of the external unit relative to the household cooking appliance.

12. The method of claim 10, wherein calibrating the signal of the external unit further includes considering a distance of the external unit relative to the household cooking appliance.

13. The method of claim 10, further comprising:
    outputting a catalogue of room layouts selectable by a user.

14. The method of claim 10, wherein determining the operating range includes receiving an actuating signal from the external unit from a region of a room, in which the household cooking appliance is disposed.

15. The method of claim 10, wherein determining the location of the external unit occurs at regular intervals.

16. A household appliance system, comprising:
    a household appliance disposed in a room;
    an external unit configured to operate the household appliance; and
    a control unit designed to perform a characterization process and, in response to completion of the characterization process, to enable operation of the household appliance by the external unit;
    wherein the characterization process includes a range definition process configured to define an operating range within which the household appliance is operable by the external unit;
    wherein the control unit is designed to output an operating request for a confirmation signal to be transmitted to the control unit from a part region of the room by the external unit while performing the range definition process.

17. The household appliance system of claim 16, wherein the part region includes a corner region of the room.

18. The household appliance system of claim 16, wherein the operating request comprises a plurality of confirmation signals, wherein each of the plurality of confirmation signals is configured to be transmitted from a distinct region of the room.

19. The household appliance system of claim 16, wherein the control unit is further configured to output a catalog of layouts for selection by a user to indicate a layout of the room.

* * * * *